Oct. 20, 1936.    W. H. FRANK    2,057,891
TROLLEY DUCT
Original Filed April 30, 1934    2 Sheets-Sheet 1
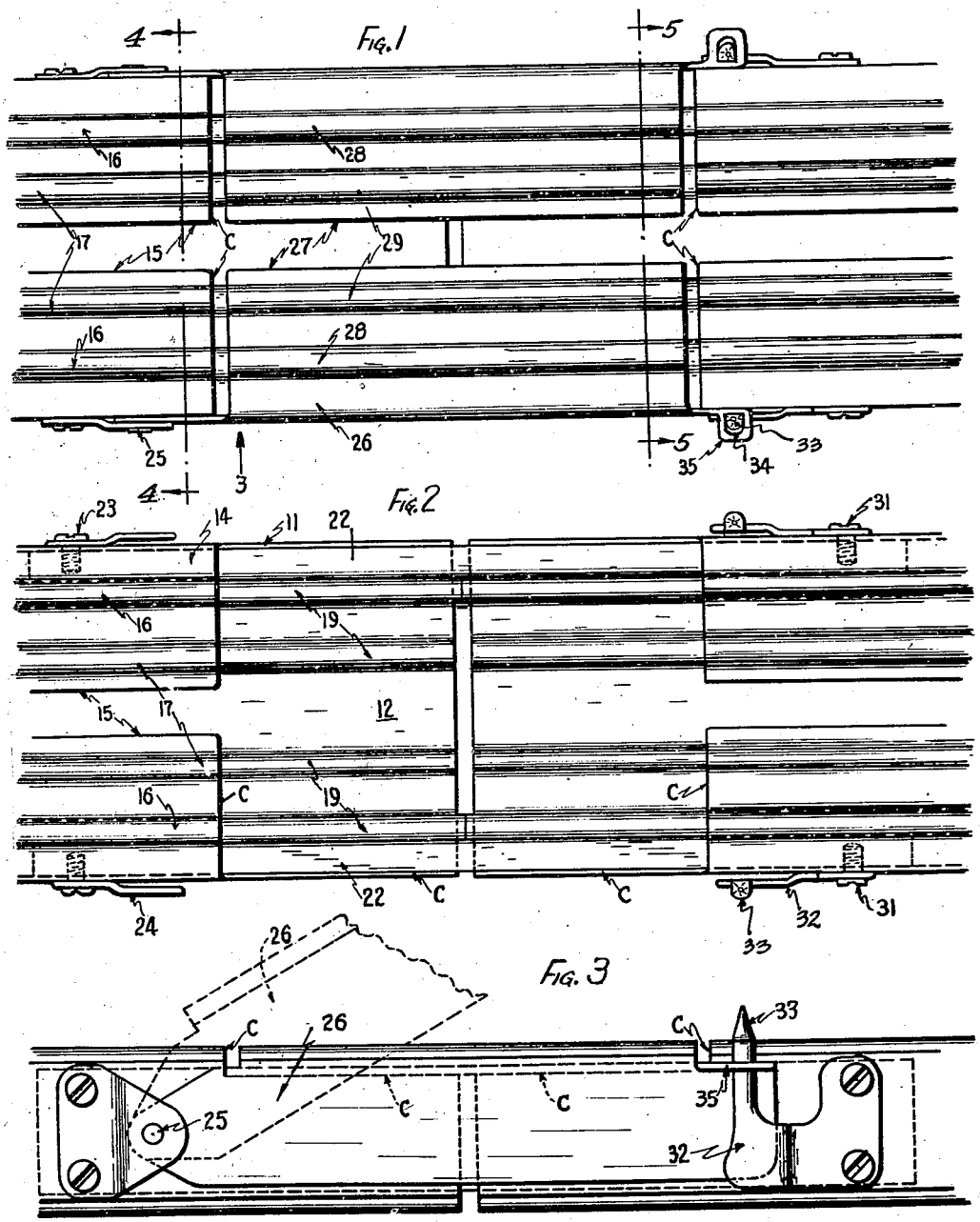

Oct. 20, 1936.  W. H. FRANK  2,057,891
TROLLEY DUCT
Original Filed April 30, 1934   2 Sheets-Sheet 2
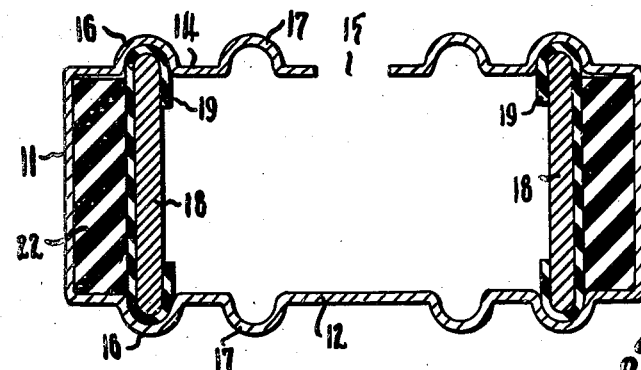
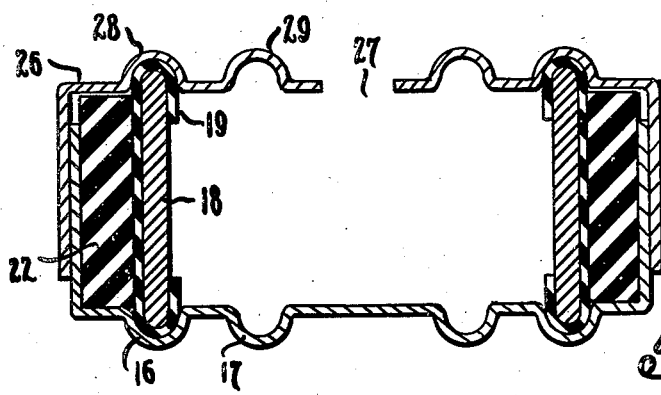
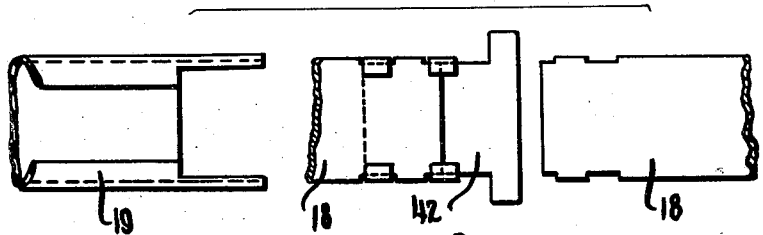
INVENTOR.
William H. Frank
BY
Daniel Cullen
ATTORNEY.

Patented Oct. 20, 1936

2,057,891

UNITED STATES PATENT OFFICE 2,057,891

TROLLEY DUCT

William H. Frank, Detroit, Mich., assignor to Bulldog Electric Products Company, Detroit, Mich., a corporation of West Virginia Original application April 30, 1934, Serial No. 723,053. Divided and this application May 6, 1935, Serial No. 20,115

13 Claims. (Cl. 247—3)

This invention relates to trolley ducts for electrical distribution systems.

Trolley ducts are generally made of duct sections joined end to end by separate couplings, and it is, by now, common practice to have the bus bar couplings effected at the points of duct coupling.

It has been proposed (see Pat. #2,014,729, filed October 29, 1934) to provide in trolley duct runs, at points remote from section couplings, intermediate entrances whereby trolleys may be inserted into or removed from a duct run between ends thereof; and, it has further been proposed to provide movable covers to close these entrances and to maintain without interruption the continuity of the rails of the duct along which ride trolley rollers.

It is proposed by the present invention to provide novel duct constructions in the nature of a trolley entrance and drop out means having movable covers for maintaining without interruption the continuity of the duct rails; the movable covers, in addition, function to connect adjacent ends of duct sections and couple them physically and electrically, and also function to provide access to the interior of the duct at the section couplings whereby manipulation of the bus bar splices may readily be effected.

Further objects and aims of the invention will presently be understood upon reference to the appended drawings, which show parts of an electrical distribution system, reference being had to the following detailed description, which aids in an understanding of these drawings. In these drawings, Fig. 1 is a top plan view of a trolley bus duct at a bus duct splice and trolley entrance, hinged covers thereof being shown in closed position;

Fig. 2 is a similar view but with the movable covers removed;

Fig. 3 is a side elevation as if in the direction of the arrow 3 of Fig. 1, with the hinged covers shown in closed position in full lines and in open position in dotted lines;

Figs. 4 and 5 are sections on lines 4—4, 5—5 of Fig. 1;

Fig. 6 shows a bus splice means.

It will be understood that a run of bus duct comprises bus duct sections, joined end to end to provide a bus duct run. Each section of bus duct comprises a section of duct of sheet metal having sides 11, a bottom 12, and a top 14, the latter having a narrow central slot 15. Formed in the bottom and top walls of the duct are two sets of beads 16 and 17. The set of beads 16 provide grooves for receiving bus bars 18 which are partially enclosed by insulation 19 rolled around the bus bars before the bus bars are assembled with respect to the duct, and the walls of these grooves firmly hold the bus bars and the insulation in place without requiring any additional securing means.

One end of each bus duct section is cut away on its top surface and partially down its sides, as best indicated in Figs. 1 to 3, at lines "C" for a considerable distance from the very end of the bus duct section. Firmly anchored and in the duct, between the sides thereof and the bus bars are rigid strips 22 preferably, but not necessarily, of insulation, and these have ends projecting beyond the end of the duct section a considerable distance. One end of each of these strips 22 is secured against sliding with respect to the bus duct by screws 23 which tap thereinto through holes in the sides of the duct, the strips being anchored by these screws and also by their frictional engagement with the sides of the duct and the insulation 19 enshrouding the bus bars. The anchored strips 22 aid in aligning the duct sections. Secured by the screws 23 to the sides of the duct are mounting plates 24, and to these plates are pivotally connected, as by rivets 25, movable covers 26. Each of these covers is L shaped in cross section and substantially takes the place of the cutaway portions of the duct top wall. The covers 26 are separated by a slot 27 which aligns with the slot 15 to continue the latter and provide a passage through which may move the trolleys of the system. The covers 26 are further provided with sets of beads 28 and 29 which align with the sets of beads 16 and 17 in the duct portions and which in effect form continuations of these sets of beads.

The other end of each duct section is cut away like the first mentioned end and receives the projecting ends of strips 22 which are secured to this duct end by screws 31, whereby adjacent ends of adjacent duct sections are intersecured and rigidly interconnected. The screws 31 anchor latch plates 32 against the side walls of the duct sections, and these have latching fingers 33 which project upwardly through holes 34 formed in ears 35 bent transversely from the ends of the covers 26. The latches serve to latch the covers in place, when duct sections are joined, so that the covers may secure duct sections to one another and form a continuous enclosed duct. The engagement between the latch plates 32 and the covers 26 provides a grounding connection between adjacent ends of duct sections, and assures a continuous ground throughout the entire duct system.

Inasmuch as each bus duct section is pre-equipped with its bus bars and their insulation, it is necessary to provide at each duct splice, a readily manipulable bus bar splice of a character that is suitable for bus duct use. The bus duct splice obviously must be such that it will not interfere with smooth continuous trolley connector run, and must be such as to cooperate with the duct portions already described. Such a bus duct splice is shown best in application Serial No. 723,053, filed April 30, 1934, of which the instant one is a divisional, and is at a duct splice and is of such a character that the splice means, comprising a C strap 42, may be mounted on the end of the bus bar at the end of a duct section to form a socket into which may be thrust the end of the bus bar at the end of another duct section so that adjacent bus duct sections may be joined to each other merely by bringing together ends of adjacent sections in the proper manner and properly connecting the parts, the bus bars automatically coupling by such end-to-end joining of the duct sections.

It is observed that the insulation strips 22 operate, not only to join sections of duct, but also to tighten up and wedge the bus splices and the bus bars, preventing loose connections and thus insuring good electrical contact between the bus bars and the splices and satisfactorily bracing the bus bars as contacts roll over their splices.

It will be observed that the bus duct of the system is so constructed that the bus duct splices provide trolley entrances and also access points for the bus bar splices, and this feature distinguishes the bus duct system of this application from bus duct systems heretofore known where trolley entrances are remote from couplings and where bus bar junctures are comparatively inaccessible because they are not located at proper points with respect to the duct splices and the trolley entrances.

I claim:

1. A sectional trolley duct construction having a bus splice at a duct splice point and having a continuous narrow riding slot widened at the duct splice point to expose the interior of the duct and to expose the bus splice, and a movable cover for narrowing the widened part of the slot, the cover comprising two separate pieces, each secured at its ends to adjacent duct sections to form the duct splice means at such point.

2. A sectional trolley duct construction having a bus splice at a duct splice point and having a continuous narrow riding slot widened at the duct splice point to expose the interior of the duct and to expose the bus splice, and a movable cover for narrowing the widened part of the slot, the cover comprising two separate pieces, each secured at its ends to adjacent duct sections to form the duct splice means at such point, certain of the securements between cover pieces and duct sections being in the nature of hinges permitting the cover pieces to be swung open with hinge movements on axes transverse to the run of the duct.

3. A sectional trolley duct construction having a continuous narrow riding slot widened at a duct splice point, and a movable cover for narrowing the widened part of the slot, the cover comprising two separate pieces, each secured to adjacent duct sections to form the duct splice means at such point.

4. A sectional trolley duct construction having a continuous narrow riding slot widened at a duct splice point, and a movable cover for narrowing the widened part of the slot, the cover comprising two separate pieces, each secured at its ends to adjacent duct sections to form the duct splice means at such point.

5. A sectional trolley duct construction having a continuous narrow riding slot widened at a duct splice point, and a movable cover for narrowing the widened part of the slot, the cover comprising two separate pieces, each secured at its ends to adjacent duct sections to form the duct splice means at such point, certain of the securements between cover pieces and duct sections being in the nature of hinges permitting the cover pieces to be swung open with hinge movements on axes transverse to the run of the duct.

6. A sectional trolley duct construction having a continuous narrow riding slot widened at a duct splice point, and a movable cover for narrowing the widened part of the slot, the cover being secured at its ends to adjacent duct sections to form the duct splice means at such point, the cover comprising two separate sections which are relatively opposed and separated by a slot merging with the duct slot.

7. A sectional slotted tube trolley bus duct construction comprising duct sections having rail portions in abutting relation to form continuous rails, the duct sections having narrow riding slots widened and notched at their ends to furnish access thereinto at such ends, and movable cover pieces covering the notches and maintaining closed the tube at such ends, and bus bar junctures at such notces and exposed by such cover pieces when open, opening of the cover pieces exposing the bus junctures and also widening the slot of the duct at the duct junctures to provide intermediate trolley entrances.

8. In sectional duct construction comprising duct sections joined end to end and having rail portions in abutting relation to form continuous rails, means for aligning the duct sections end to end comprising rigid bars within the duct anchored to and connecting the abutting ends.

9. In sectional duct construction comprising duct sections joined end to end and having rail portions in abutting relation to form continuous rails, means for aligning the duct sections end to end comprising rigid bars within the duct anchored to and connecting the abutting ends and received in grooves thereof.

10. A sectional slotted tube trolley bus duct construction comprising duct sections having rail portions in abutting relation to form continuous rails, the duct sections having narrow riding slots widened and notched at their ends to furnish access thereinto at such ends, and movable covers, each comprising two separate portions, covering the notches and maintaining closed the tube at such ends, and bus bar junctures at such notches and exposed by such covers when open, opening of the covers exposing the bus junctures and also widening the slot of the duct at the duct junctures to provide intermediate trolley entrances, the covers being secured to adjacent duct sections to form duct splices.

11. A sectional slotted tube trolley bus duct construction comprising duct sections having rail portions in abutting relation to form continuous rails, the duct sections having narrow riding slots widened and notched at their ends to furnish access thereinto at such ends, and movable covers, each comprising two separate portions, covering the notches and maintaining closed the tube at such ends, and bus bar junctures at such notches and exposed by such covers when open, opening of the covers exposing the bus junctures and also widening the slot of the duct at the duct junctures to provide intermediate trolley entrances; the covers being secured to adjacent duct sections to form duct splices, the securement between the covers and duct sections including hinges permitting hinge movement of the covers.

12. A slotted tube trolley duct having the slotted wall thereof cut away to provide a trolley entrance, two separate L-shaped portions similar to the cutaway portions and insertable in the entrance to replace the cutaway portions and separated by a continuation of the slot when in place, the portions being individually and hingedly connected to the duct on axes transverse to the run of the duct.

13. A slotted tube trolley duct having the slotted wall thereof cut away to provide a trolley entrance, L-shaped portions similar to the cutaway portions and insertable in the entrance to replace the cutaway portions and separated by a continuation of the slot when in place, the portions being individually and hingedly connected to the duct on axes transverse to the run of the duct whereby they may be swung away from the duct, the duct having rails for rollers of trolleys, which rails are cut away at the entrances, the L-shaped portions having rails insertable into the cutaway parts of the duct rails to continue the duct rails even at the entrances.

WILLIAM H. FRANK.